United States Patent [19]

Collmann

[11] Patent Number: 4,638,756
[45] Date of Patent: Jan. 27, 1987

[54] DEVICE FOR THE POSITIONING OF TIRES

[76] Inventor: Wilhelm Collmann, Auf der Höhe 25, 2400 Lübeck, Fed. Rep. of Germany

[21] Appl. No.: 698,424

[22] Filed: Feb. 5, 1985

[30] Foreign Application Priority Data

Feb. 24, 1984 [DE] Fed. Rep. of Germany ....... 3406719

[51] Int. Cl.⁴ .......................... B05C 1/02; B05C 7/06; B65G 47/22
[52] U.S. Cl. .................................... 118/215; 118/232; 118/243; 118/261; 198/344; 198/413
[58] Field of Search ................ 198/344, 413; 118/232, 118/243, 261, 215

[56] References Cited

U.S. PATENT DOCUMENTS 4,239,570 12/1980 Kerwin ............................ 198/344 X Primary Examiner—John P. McIntosh
Attorney, Agent, or Firm—Balogh, Osann, Kramer, Dvorak, Genova & Traub

[57] ABSTRACT

A device for positioning tires comprises a station to which the tires are separately conveyed while laid flat on a driven conveyor and at which the tires are aligned with respect to a plane set at right angles to the conveyor by means of adjustable or displaceable stops and are thereupon exposed to a treatment, processing or measuring operation. So that the tire in question may be placed in rotation without a complementary driving system, the station has arranged thereat at least one liftable and lowerable support member eccentrically positioned with respect to the aligned tire, which may be placed in contact with the downwardly directed tire sidewall by being lifted, in order to tilt the tire to one side. The tire placed in the tilted position and secured against being moved away rests on the conveyor in the area of its lowest point and is placed in rotation by said conveyor.

9 Claims, 3 Drawing Figures

DEVICE FOR THE POSITIONING OF TIRES

BACKGROUND OF THE INVENTION

1. Field of the Invention

The invention relates to a device for the positioning of tires which are conveyed separately whilst lying on a conveyor, to a station at which the tires are aligned with respect to a plane extending at right angles to the conveyor by means of adjustable stops and are exposed to a treatment, processing or measuring operation.

2. Description of the Prior Art

Machines are known for the treatment and processing of motor vehicle tires, to which the tires are conveyed in the recumbent position by means of a roller conveyor, are fed singly into the machine and are centrally lined up with respect to tire reception means of the machine by means of a centring system. The centring system commonly comprises four rocking or pivoting levers having stops at their extremities which are placed in contact with the outer periphery of the tire conveyed into the machine and thereby place the tire in its central reception position. After this centring action, the tire is grasped by the reception means and lifted into an operating position. In this position, the tire is then placed in rotation by means of a separate driving mechanism, so that the intended operations may be performed on the same by means of appropriate tools.

The separate driving mechanism is needed, in the case of these known machines for the tire in question, inasmuch as—in view of the considerable contact thrust of the tools working on the same—on the one hand the tire is rotatably installed in the said reception means, and on the other hand a comparatively high torque overcoming the operating forces of the tools is required for its rotation.

There are other operations during which tires may well have to be turned around their axis of rotation, but during which the tire is acted upon by no forces or small forces only. For example, operations of this kind may consist in providing the tire with a lubricant so that it may be more easily fitted on and withdrawn again from flanges or the like of tire processing or tire testing machines. The tire is also placed in rotation by means of a separate drive in the case of machines or devices organised for this purpose.

SUMMARY OF THE INVENTION

It is accordingly an object of the invention to provide a device of the kind defined in the foregoing, in which the particular tire positioned at the station may be placed in rotation for performing the actions which are to be carried out on the same, without a separate driving system.

In accordance with the invention at least one support member is situated at the said station, which is eccentrically positioned with respect to the aligned tire and is liftable and lowerable and which may be brought into contact with one side of the downwardly directed tire sidewall by being lifted, in order to cause the tire to tilt to one side, and the tire placed in the tilted position and secured against being carried away may be placed in rotation by virtue of the contact of the side radially opposite the support member with the conveyor.

In a device of this nature, the force of the conveying element or elements of the conveyor is also exploited in accordance with the invention to impart rotation to a tire present at the station. Since the tire is lifted eccentrically at one side and at one point by the freely co-rotating support member and rests on the conveyor only at a point situated radially opposite to the said point, a turning moment is available which places it in rotation. Whilst doing so, the tire is blocked against being conveyed onwards, which may be done by means of existing or separate stops. This eliminates the need for a separate driving system for performing the rotary displacement of the tire, which in addition to a less complex structure leads to commensurate savings in the production of the device.

The device in accordance with the invention may be so formed moreover, for example, that lubricant may be applied on the rims of the tire present at the station. A coating roller carrying lubricant is provided for this purpose, which is inserted in an erect position and preferably from below into the space delimited by the inner periphery of the tire. When this roller is in its raised working position, the stops which had previously aligned the tire, are moved out of their aligning positions, so that the tire has the area of its inner rim surfaces carried against the coating roller in view of a small onward displacement by the conveyor, and is retained by the said roller. The torque derived from the conveyor and then acting on the tire places the tire in rotation, whilst the inner rim surfaces of the tire roll along the peripheral surface of the co-rotating coating roller, lubricant thereby being transferred from the roller to both rim surfaces of the tire.

The lubricant may thus be applied precisely on the inner rim surfaces in an uncomplicated manner, thereby eliminating the disadvantages caused by the known spray application method, e.g. such as placing at risk of other machine elements and annoyance of operating personnel by spraying mist. The complementary advantage is offered at the same time, that the tires may be processed without interruption, that is under continuous operation of the device in accordance with the invention, notwithstanding the size of their diameter. Other activities may however also be performed on the tire, e.g. detecting codes inscribed on the tire side wall by means of a pick-up head. The said roller may then be constructed as a co-rotating stop to secure a specific position of the tire in question, the succession of tires of different diameter not being of importance in this case, either. Other objects and advantages of the invention are described in particular in the following with reference to an example of embodiment illustrated in the accompanying drawings.

DETAILED DESCRIPTION OF THE PREFERRED EMBODIMENT

Figure 1:
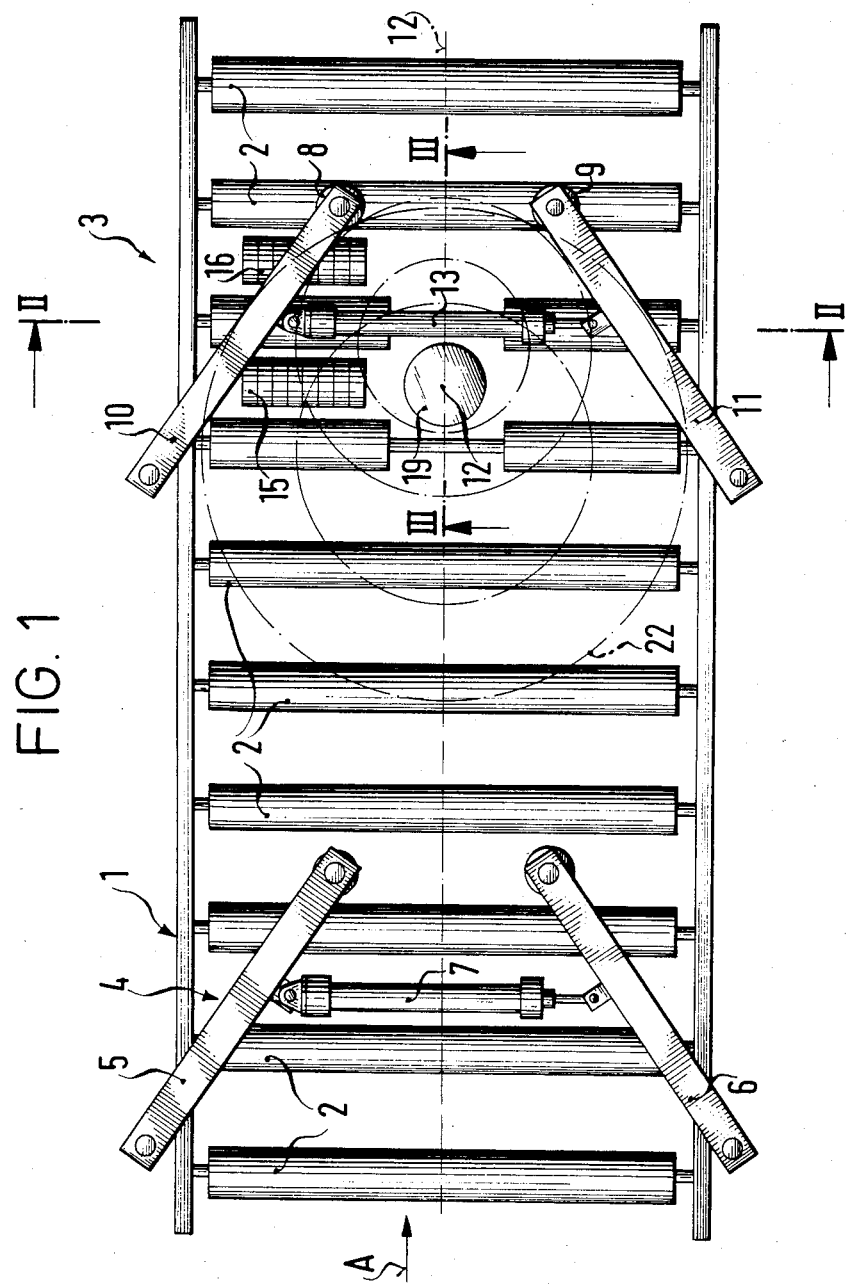
FIG. 1 shows a plan view of the example of embodiment.

According to FIG. 1, a conveyor 1, e.g. a normal so-called roller conveyor, is borne on a base by means of a framework or the like (not shown in particular), with motor vehicle tires being conveyed in the direction of the arrow A on its rollers 2. The conveyor incorporates an operating station 3 at which a tire is in each case exposed to a treatment, processing, measuring or other operation. The tires are supplied singly to this station by means of the rollers 2, to which end the conveyor may comprise a separating mechanism 4 which may for example comprise two first pivoting levers 5 and 6 which may be placed in a closed and an open position by means of a pressure fluid cylinder drive 7 controlled appropriately in a conventional manner, to allow one tire to pass through to the station 3 in each case. As a rule, all the rollers 2 of the conveyor 1 will be arranged to be driven, but it is in any case necessary that at least a few of the rollers 2 in the area of the station 3 should be made rotarily entrainable, as will become apparent.

Two mutually spaced apart stops 8 and 9 in the form of rollers which are each freely rotatable about a vertical axis are provided above the conveyor 1 in the area of the station 3, said stops being arranged pendantly on two further pivoting levers 10 and 11 respectively, and the tire coming into contact with said stops for aligning purpose as shown by FIG. 1. The two pivoting levers 10 and 11 are each laterally hinged on the conveyor 1 and assume a V-shaped configuration in the aligning position shown, so that the tire arriving on the conveyor is reliably aligned in lateral direction. The stops 8 and 9 define a longitudinally extending central plane 12 which extends at right angles to the conveyor 1 and, in the case illustrated, coincides with the longitudinal centre of the conveyor.

The other pivoting levers may also be pivoted reciprocatingly by means of a single pressure fluid cylinder 13. Alternately, each pivoting lever may also be equipped with its own pressure fluid cylinder. Furthermore, the stops 8, 9 of the levers 10 and 11 are combined with sensors (not shown), e.g. in the form of limit switches, so that the pressure fluid cylinder 13 may be operated accordingly in a conventional manner when the tire is aligned, in order to place the levers 10, 11 in an open position after a required period.

As apparent from FIG. 1, the tires running into the station 3 need not be sorted with respect to their diameter, since their axis of rotation will always coincide with the said central plane 12 in the aligned condition of the tire.

A support member system 14 is provided on the conveyor 1 offset towards one side of the central plane 12, which may for example have two horizontal roller members 15, 16 for preference, which in accordance with FIG. 1 are freely rotatably installed on a frame 17 arranged to be upwardly and downwardly pivotable on the conveyor, between the rollers 2 of the conveyor 1. The frame 17 is pivoted by means of a pressure fluid cylinder 18.

Figure 3:
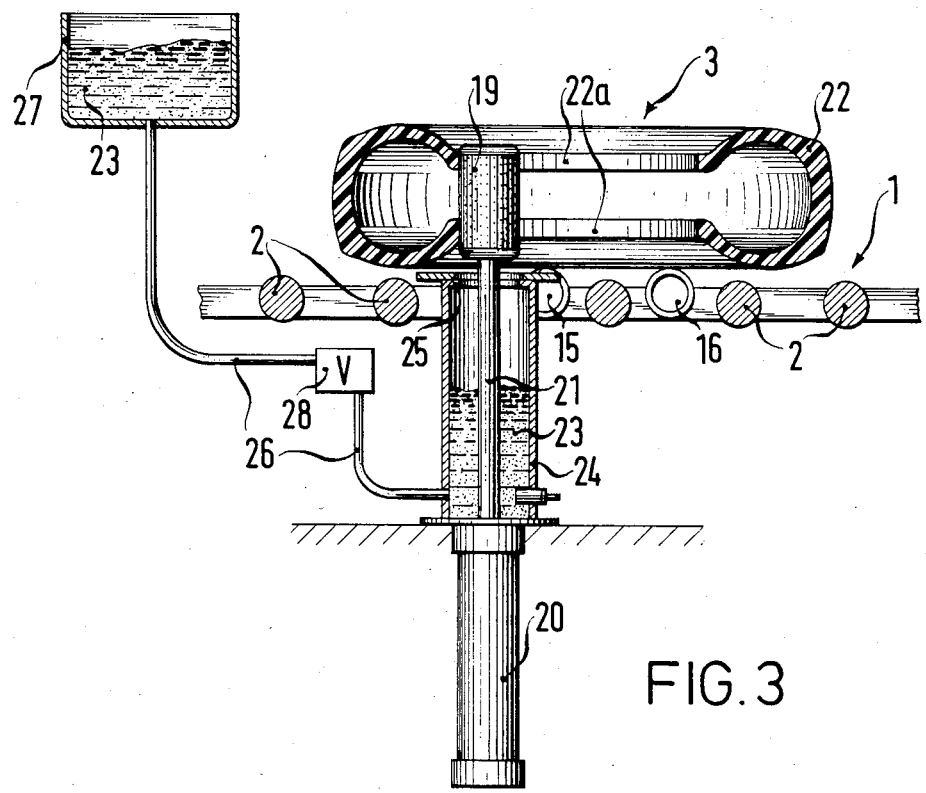

Furthermore, the device proposed is equipped with at least one rotationally symmetrical element 19 freely rotatable around a vertical axis, which may be moved into and out of the displacement path of the tire 22 situated on the conveyor 1 by means of a displacement cylinder 20 and of a connecting rod 21 in the direction of its vertical axis of rotation and according to the double-headed arrow B, as most clearly apparent from FIG. 3. The vertical axis of rotation of the element 19 advantageously coincides with the central plane 12 serving the purpose of an aligning plane, to prevent a lateral shift of the tire which is to be processed, when the same is being placed in rotation upon bearing on the element 19. The axis of rotation of the tire present in the operating position thus coincides with the plane 12.

Figure 2:
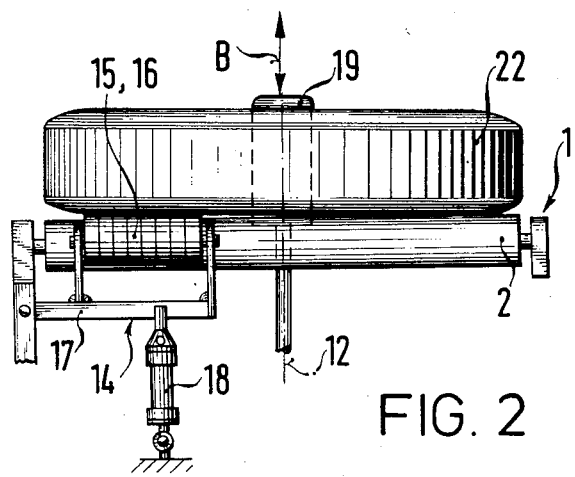
FIGS. 2 and 3 show cross-sections along the lines II—II and III—III respectively, in FIG. 1.

When the element 19 has been lifted into its operating position according to FIGS. 2 and 3, the other pivoting levers 10 and 11 are opened, so that the previously aligned tire 22, e.g. the larger of the two tires indicated diagrammatically in FIG. 1, is carried forward through a short distance by means of the rollers 2, until it has the inner surface 22a of both its so-called rims placed in contact with the periphery of the element 19 as apparent from FIG. 3. Since at least some of the rollers 2 of the conveyor 1 are rotarily entrained in the area of the station 3, and the tire 22 has in the meanwhile been lifted off the driven rollers at one point by means of the roller-shaped support members 15, 16 and is retained by the element 19, the tire then rests merely at the point opposite to the rollers 15, 16 on at least one driven roller 2, by means of which it may be placed in rotation.

In addition to its task as a stop or abutment, the element 19 may also act as an applicator tool. To this end, it may be constructed in the form of a coating roller whereby a lubricant 23 may be applied on the rim surfaces 22a of the tire 22. Above the displacement cylinder 20 is provided an upwardly open container 24 preferably situated below the conveyor, which contains the lubricant having a flowable consistency. In its initial position, the roller is situated within the container 24 so that its circumference is encircled by the lubricant, which then adheres to the circumference in adequate quantity when the roller is upwardly extended out of the container by means of the displacement cylinder.

In the area of its opening, the container 24 is equipped with an annular and preferably elastic scraper 25 for stripping surplus lubricant off the roller 19, meaning that an adequate layer of lubricant should remain on the roller to allow of coating the rim surfaces 22a. The coating of the rim surfaces with lubricant by means of the roller occurs in such manner that the freely rotatable roller is equally placed in rotation by means of the frictional engagement established with these surfaces of the rotating tire, so that the outer surface of the roller rolls along the rim surfaces and whilst doing so transfers the lubricant. After completion of the application of lubricant, the roller 19 is downwardly retracted into the container wherein it is again immersed in the lubricant. The processed tire 22 is then carried away by the conveyor 1, since the support rollers 15, 16 have also been lowered in the meanwhile and the stops 8, 9 are in the open position. When the tire has passed beyond these stops, the levers 10, 11 are pivoted back into the closed or aligning position, so that the next tire may be aligned.

The container 24 is in communication via a pipe 26 with a storage vessel 27 situated at a higher level, so that sufficient lubricant is always available in the container 24. A float valve 28 is preferably situated in the pipe 26, which automatically controls the level of lubricant in the container 24.

As an alternative, or as a complement to the lubricant coating system described, it is also possible to provide a detector system (not shown) to allow of picking up code markings provided on the, particular tire in accordance with which the tire is exposed to other operations, e.g. a sorting operation, at a station following the station 3. In this connection, the roller 19 assures a specific position of the tire at the station 3 irrespective of the diameter of the tire, thereby assuring reliable detection of the tire coding.

What is claimed is:

1. A device for laterally positioning a tire lying on a conveyor, which tire is conveyed individually to a station of the conveyor at which station the lying tire is aligned laterally with respect to a vertical plane of the conveyor extending in the longitudinal direction of the latter by means of stops which are movable between a position above the conveyor to block the passage of the tire thereon and a position allowing the passage of the tire, and at which station the tire is subjected to a processing step, wherein there is provided at least one rotationally symmetrical element forming a stop for the tire when said movable stops are in the position allowing the passage of the tire, said element being rotatable about its longitudinal axis lying parallel to the rotational axis of the tire lying on the conveyor and being movable between a working position in which it stops the tire and a non-working positioning allowing the passage of the tire, said station including at least one support member which is formed roller-like, laterally spaced to one side of said vertical plane, and arranged within a free region of the conveyor, and being rotatable about an axis lying at right angles to said vertical plane, and being liftable against the downwardly directed tire sidewall for the purpose of one-sided tilting of the tire and being lowerable therefrom, whereby, when said support member is lifted, rotation of the tilted tire is caused by virtue of the contact of a region of the tire sidewall still resting on the conveyor, with the conveyor.

2. A device as claimed in claim 1, wherein the support member comprises a freely rotatable roller.

3. A device as claimed in claim 1, wherein said element is rotatable around a vertical axis, which element is movable along its vertical pivot axis out of and into the conveyed path of the tire and acts as an inner stop for the tire positioned in the operating position.

4. A device as claimed in claim 3, wherein the axis of vertical displacement of said rotationally symmetrical element coincides with said vertical plane of alignment of the conveyor.

5. A device as claimed in claim 4, wherein said rotationally symmetrical element comprises a coating roller situated below the conveyor, which roller may be driven by the tire for the application of a lubricant on the rim seating surfaces of the tire.

6. A device as claimed in claim 5, wherein the coating roller dips into an upwardly open container which contains the lubricant and which container is situated below the conveyor.

7. A device as claimed in claim 6, wherein the opening of said container is provided with a scraper for removal of surplus lubricant from the coating roller.

8. A device as claimed in claim 6, wherein the container is connected to a storage vessel positioned at a higher level and the level of the lubricant within the container may be controlled by means of a float valve.

9. A device for laterally positioning and rotating a tire lying on a conveyor comprising:
 a conveyor with a plurality of driven rollers to support and convey the lying tire;
 a pair of stop members, each comprising a freely rotatable roller carried by a pivoting lever and being movable with said lever between a position above the rollers of said conveyor to block the passage of a tire thereon and a position allowing the passage of the tire;
 means comprising at least one rotationally symmetrical element being rotatable about its rotational axis and being movable into and out of the converging path of the tire lying on the conveyor and acting as a stop for the tire, thus defining the operation position of the tire when said pivoting levers have been moved into its passage position; and
 a support member comprising at least one freely rotatable roller provided between and parallel to the conveyor rollers immediately upstream of the roller of one of said pivoting levers, offset towards one lateral side of said conveyor and being liftable with its upper surface above the upper surfaces of the adjacent conveyor rollers, in order to support one side of a tire with the opposite side of the tire resting on at least one of said driven rollers, whereby rotation of said driven rollers causes said tire to rotate about its own axis.

* * * * *